US006434511B1

(12) United States Patent
Stein et al.

(10) Patent No.: US 6,434,511 B1
(45) Date of Patent: Aug. 13, 2002

(54) PROCESSOR AND METHOD FOR DETERMINING THE STATISTICAL EQUIVALENCE OF THE RESPECTIVE MEAN VALUES OF TWO PROCESSES

(75) Inventors: Jeffrey William Stein, East Greenbush; Necip Doganaksoy, Clifton Park, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/407,310

(22) Filed: Sep. 28, 1999

(51) Int. Cl.[7] ................................................ G06F 17/18
(52) U.S. Cl. ........................ 702/179; 702/33; 702/81; 702/113; 702/182
(58) Field of Search .................. 702/33, 81–84, 702/113, 123, 119, 169, 170, 171, 172–181, 182, 183, 187, 188, FOR 137, FOR 139, FOR 170, FOR 171; 703/2; 700/117, 196, 192, 97, 51, 129, 174; 705/7

(56) References Cited

U.S. PATENT DOCUMENTS

| | | | | |
|---|---|---|---|---|
| 3,851,158 A | * | 11/1974 | Pfeffermann | 235/150.52 |
| 4,719,586 A | * | 1/1988 | Moyer et al. | 364/183 |
| 5,117,379 A | | 5/1992 | Yanagiuchi et al. | |
| 5,282,150 A | | 1/1994 | Yamada | |
| 5,339,249 A | * | 8/1994 | Schaeffer | 364/474.18 |
| 5,339,257 A | * | 8/1994 | Layden et al. | 364/552 |
| 5,388,058 A | * | 2/1995 | Yamada | 364/554 |
| 5,392,226 A | * | 2/1995 | Hamilton | 364/551.01 |
| 5,715,180 A | | 2/1998 | Hu | |
| 5,717,607 A | | 2/1998 | Hu | |
| 5,841,676 A | | 11/1998 | Ali et al. | |
| 5,956,251 A | * | 9/1999 | Atkinson et al. | 364/468.16 |
| 5,987,398 A | * | 11/1999 | Halverson et al. | 702/179 |

OTHER PUBLICATIONS

Heibrum et al. "Sample size determination for the comparison of normal means when one sample size if fixed", Computational Statistics & Data Analysis 3 (1985), pp. 99–102 North Holland.*

Patent Cooperation Treaty Written Opinion on Attorney Docket 26,872, Ser. No. 09/407,310 Filed Sep. 28, 1999.

Lk Heilbrun, Et Al "Sample Size Determination For The Comparison Of Normal Means When One Sample Size Is Fixed", Computational Statistics & Data Analysis 3 (1985), pp. 99–102 North Holland.

A Luttke, "Repli: A Program In Basic For Determination Of Approximate Sample Size", Int J Biomed Comput. 27 (1991) pp. 193–200, Elsevier Scientific Publishers Ireland, Ltd.

D. Krewski, Et Al, "Sample Size Determination For The Interval Estimation Of The Mean Or Median Of A Distribution", J. Statis. Comput. Simul, 1981, vol. 13, pp. 169–179, Great Britain.

D. Schuirmann, A Comparison Of The Two One–Sided Tests Procedure And The Power Approach For Assesing The Equivalence Of Average Bioavailabiity, Journal Of Pharmacokinetics & Biopharmaceutics, vol. 15, No. 7, 1987, pp. 657–680.

* cited by examiner

Primary Examiner—Marc S. Hoff
Assistant Examiner—Carol S. Tsai
(74) Attorney, Agent, or Firm—David C. Goldman; Jill M. Breedlove

(57) ABSTRACT

A computer-based method and processor for determining the equivalence of the respective mean values of physical processes used in the production of goods is provided. The method allows for inputting respective values of various parameters. A storing step allows for storing each inputted value into a memory unit, and a computing step allows for computing, based on the stored values, respective sample sizes required by the processes to determine whether the respective means of the processes are equivalent to one another within a selected equivalence range and within sufficiently acceptable probabilities. The magnitude of the respective sample sizes is sufficiently small to allow a user to experimentally demonstrate the equivalence of the respective means of the processes.

16 Claims, 5 Drawing Sheets

PROCESSOR AND METHOD FOR DETERMINING THE STATISTICAL EQUIVALENCE OF THE RESPECTIVE MEAN VALUES OF TWO PROCESSES

BACKGROUND OF THE INVENTION

The present invention relates generally to physical processes, such as industrial processes and, more particularly, to a processor and method for determining the statistical equivalence of the respective mean values of two of such processes.

Engineers and scientists are often interested in comparing the mean values of two processes with the objective of demonstrating a statistically (and practically) significant difference between them. In some cases, it may be of interest to determine that two process means are not different, or at least close enough to be considered equivalent. For example, an engineer may be interested in determining if the mean productivity, $\mu_x$, of a standard process X, is equivalent to the mean productivity, $\mu_y$, of a new state of the art process Y, which costs considerably more than process X.

During the planning stage of an experiment for determining the equivalence of two process means, the investigator may be faced with the fundamental question of "How many samples do I truly need to demonstrate statistical equivalence?" As suggested in many statistical textbooks, see for example, textbooks by Devore, J. L. (1987), *Probability and Statistics for Engineering and the Sciences*, Monterey: Brooks/Cole Publishing, or by Ott, Lyman (1988), *An Introduction to Statistical Methods and Data Analysis*, Boston: PWS-Kent, prior techniques have employed a somewhat cumbersome formula or algorithm to determine the sample size, n, when conducting a two-sided test of no difference between two process means at a level of significance, $\alpha$. In order to achieve a power of $1-\beta$ when the true difference between the process means is $|\mu_x-\mu_y|\geq\Delta$, the required sample size (from each process) is approximately, $$n = \frac{2\sigma^2(z_{\alpha/2} + z_\beta)^2}{\Delta^2}, \quad (1)$$

where $\sigma^2$ denotes the common variance of the two processes. Here, $Z_k$ denotes the $100(1-k)$ percentile of the standard normal distribution. Unfortunately, application of this formula yields an infinite sample size when $\Delta=0$ (i.e., no difference of two population means). Even if a very small difference (e.g., $\Delta=0.001$) between the two means is specified, this formula often yields a sample size too large to be practical in industrial processes generally subject to substantially tight budgetary and/or scheduling constraints in order to successfully compete in today's global economy.

In view of the foregoing drawbacks of known algorithms for computing sample sizes having a sufficiently small magnitude so as to be of practical use to a user in an industrial setting, it is desirable to provide a method and processor that advantageously allows the user for determining the mean equivalence of respective processes without sacrificing the statistical accuracy of the determination of equivalence and without requiring relatively large sample sizes. It is further desirable that such algorithm be computationally friendly, that is, an algorithm that is computationally straight forward to compute without the user having to spend any inordinate amount of programming time and without having to allocate any significant computational resources to its solution.

BRIEF SUMMARY OF THE INVENTION

Generally speaking, the present invention fulfills the foregoing needs by providing a computer-based method for determining the equivalence of the respective mean values of two physical processes, X and Y, generally used in the production of predetermined goods. The method allows for inputting respective values for upper and lower limits $[\theta_L, \theta_U]$ of a range for testing the difference or ratio of mean equivalence of two respective processes. The method further allows for inputting a value for a parameter $\alpha$ indicative of a probability of falsely declaring equivalence in the equivalence range and for inputting a value for a parameter $1-\beta$ indicative of a probability of correctly declaring equivalence in the equivalence range. Additional inputting steps allow for inputting a value indicative of an externally-derived standard deviation a that is mutually shared by the respective processes and for inputting a value for a parameter $\Delta$ indicative of a planned location shift between the respective mean values of the respective processes. A storing step allows for storing each inputted value from the foregoing inputting steps into a memory unit, and a computing step allows for computing, based on the stored values, respective sample sizes, $n_x$, and $n_y$, required by the respective processes X and Y to determine whether the respective mean values of the respective processes are equivalent to one another at least within the selected equivalence range and within the respective probabilities, the magnitude of the respective sample sizes being sufficiently small to allow a user to experimentally demonstrate the equivalence of the respective mean values of the respective processes.

The present invention further fulfills the foregoing needs by providing a processor for determining the equivalence of the respective mean values of two physical processes, X and Y, generally used in the production of predetermined goods. The processor includes, for example, a suitable input/output unit that conveniently provides means for inputting respective upper and lower limits $[\theta_L, \theta_U]$ of a range for testing the mean value equivalence of the respective processes; means for inputting a value $\alpha$ indicative of a probability of falsely declaring equivalence in the equivalence range; means for inputting a value $1-\square$ indicative of a probability of correctly declaring equivalence in the equivalence range, means for inputting an externally-derived standard deviation value $\sigma$ being mutually shared by the respective processes; and means for inputting a value $\Delta$ indicative of a planned location shift between the respective mean values of two processes, X and Y. A memory unit is used for storing each inputted value. A computing module is coupled to the memory unit to receive each stored value. The computing module is configured to determine respective sample sizes, $n_x$, and $n_y$, required by the respective processes X and Y to determine whether the respective mean values of the respective processes are equivalent to one another at least within the selected equivalence range and within the respective probabilities. In one key advantage of the present invention, the magnitude of the respective sample sizes is sufficiently small to allow a user to experimentally demonstrate the equivalence of the respective mean values of the respective processes.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
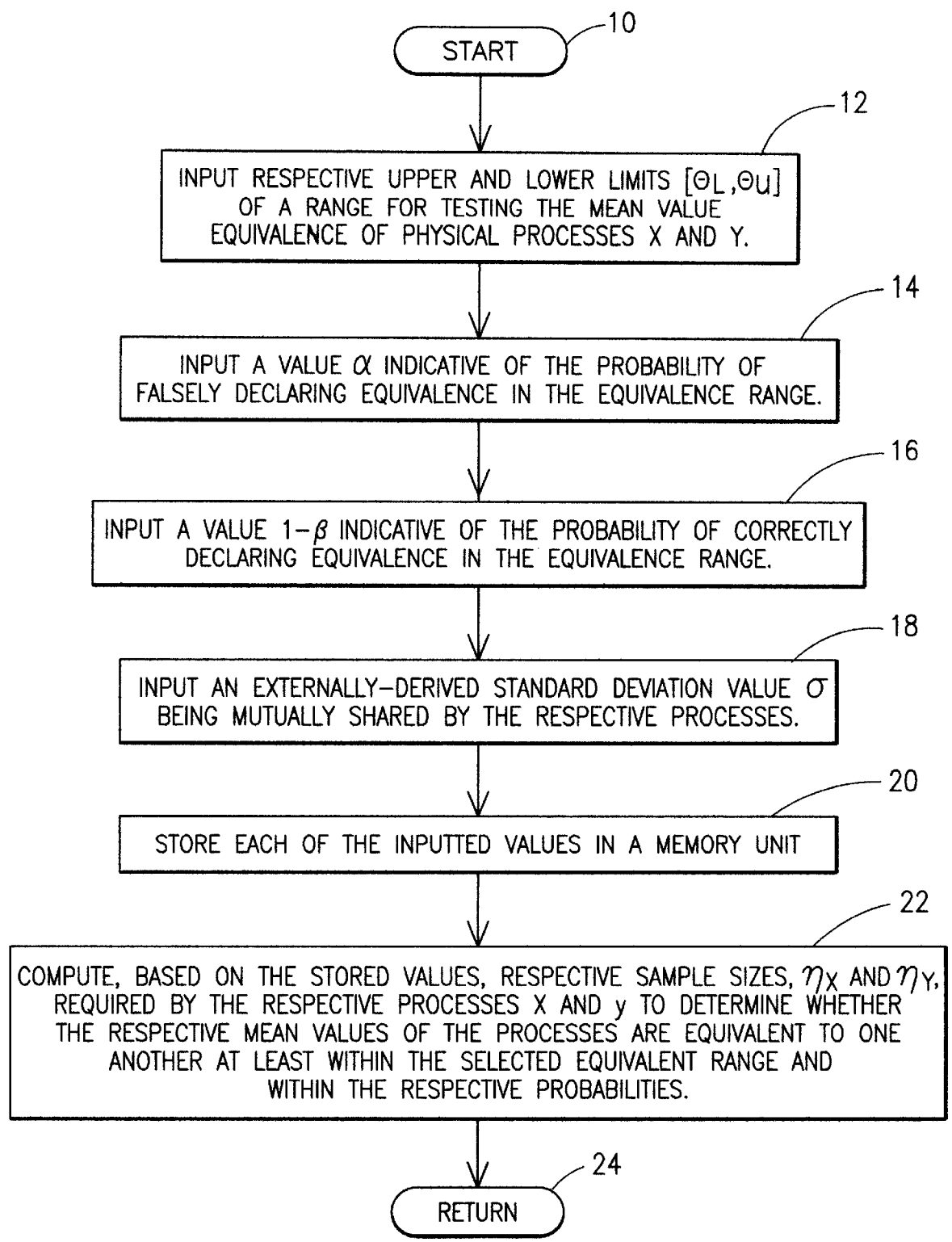
FIG. 1 is a flowchart of an exemplary algorithm of the present invention.

It will be appreciated by those skilled in the art that, in general, statistical properties of processes, may be readily characterized by various statistical parameters, such as the standard deviation or a distribution percentile. Thus, although the description below will focus on a comparison of mean values, it will be understood that the approach of the present invention may be extended to determine the sample size for these other process parameters. Further, the techniques described below are appropriate for both enumerative and analytic studies. For learning background details regarding distinctions between enumerative and analytic studies, see Deming, W. E. (1975) On Probability As A Basis For Action, *The American Statistician*, 29, 146–152. For further details, see publication by Hahn, G. J. and Meeker, W. Q. (1991) *Statistical Intervals: A Guide For Practitioners*, New York: Wiley. However, because analytic studies are encountered more often in industrial applications, the present description presents exemplary results in such context. A notable assumption of analytic studies is that the future process about which one wishes to make inferences is substantially identical from a statistical point of view to that process from which the sample was selected.

Classical Problem Formulation

This section presents a classical approach that has been used to test the hypothesis of no difference between two process means and provides some of the underpinnings for the present invention. By way of example, let $\overline{X}$ and $\overline{Y}$ denote independent sample means based on random samples of size $n_x$ and $n_y$ from processes, X and Y, respectively. The observations from these processes are assumed to follow normal distributions with means $\mu_x$ and $\mu_y$, respectively. The standard methods to compare means are reasonably robust to mild departures from the normality assumption unless the sample size is very small and the deviation from normality is pronounced. For simplicity, we assume the processes have a common variance, $\sigma^2$; the formulas may be modified accordingly to reflect departures from this assumption.

The sample size formula (1) stems from the following classical hypothesis test, $$H_0': \mu_x-\mu_y=0 \text{ vs. } H_1': \mu_x-\mu_y \neq 0. \tag{2}$$

The null hypothesis, $H_0'$, is rejected at a nominal level of significance, $\alpha$, if $$|Z| = \frac{|\overline{X}-\overline{Y}|}{\sigma_{\overline{X}-\overline{Y}}} > z_{\alpha/2}, \tag{3}$$

where $$\sigma_{\overline{X}-\overline{Y}} = \sigma\sqrt{\frac{1}{n_X}+\frac{1}{n_Y}}, \tag{4}$$

$\sigma$ is the common standard deviation, and $n_x$ and $n_y$ denote the samples sizes for processes X and Y, respectively. The standard deviation is generally unknown in most applications; a planning value based on pilot studies is often substituted for $\sigma$. Sample sizes may be calculated if $\sigma$ is to be estimated from the data but an iterative technique involving the Student's t-distribution is required in such cases (see Hahn and Meeker, 1991).

By definition, the type II error, $\beta$, is the probability of accepting the null hypothesis if indeed, $\mu_x-\mu_y=\Delta>0$. For an upper one-sided test of (2) (i.e., $H_0'$: $\mu_x-\mu_y>0$), the sample size to achieve a power of $1-\beta$ must satisfy the following equation, $$\beta = P\left(\frac{\overline{X}-\overline{Y}}{\sigma_{\overline{X}-\overline{Y}}} < z_\alpha\right),$$

or equivalently, $$\beta = P\left(Z \leq z_\alpha - \frac{\Delta}{\sigma_{\overline{X}-\overline{Y}}}\right),$$

where Z is defined in (3). The latter probability statement follows from the former by noting the distribution of $(\overline{X}-\overline{Y})$ is normal with mean $\Delta$ and standard deviation $\sigma_{\overline{X}-\overline{Y}}$ defined in (4) when $\mu_x-\mu_y=\Delta$. It is often (statistically and practically) advantageous to obtain equal sample sizes from each process (i.e., $n_x=n_y=n$) so that from (4) $\sigma_{\overline{X}-\overline{Y}}=\sigma\sqrt{2/n}$. Assuming equal sample sizes, a translation of this latter probability statement yields the following equation for the sample size (for an upper one-sided hypothesis test), $$n = \frac{2\sigma^2(z_\alpha+z_\beta)^2}{\Delta^2}. \tag{5}$$

This expression is also correct for a lower-tailed test, whereas replacing $\alpha$ by $\alpha/2$ in (5) yields (1) for the two-tailed hypothesis test given in (2).

The sample size formula (1) is not appropriate to demonstrate equivalence of two process means because it is derived from an inappropriate formulation of the (classical) hypothesis. The problem with this classical formulation is that the hypotheses, $H_0'$ and $H_1'$, are designed to demonstrate a difference rather than an equivalence of two process means.

Revised Problem Formulation

The sample size formula presented in this section, as will be appreciated by those skilled in the art, and in accordance with the present invention, advantageously allows the user to determine sufficiently small sample sizes so as to experimentally verify the equivalence of the two processes in an industrial operation that, as suggested above, may be subject to substantial budgetary and scheduling constraints. The revised formulation, may be referred as an interval hypothesis testing approach. As set forth below, the sample size formula presented here is appropriate to demonstrate the equivalence of two process means.

The interval hypothesis, $H_1$, requires the difference between two process means to lie within an equivalence interval, $[\theta_L, \theta_U]$, so that rejection of the null hypothesis, $H_0$, at a nominal level of significance, a is a declaration of equivalence, $$H_0: \mu_x-\mu_y \leq \theta_L \text{ or } \mu_x-\mu_y \geq \theta_U \text{ vs. } H_1: \theta_L<\mu_x-\mu_y<\theta_U. \tag{6}$$

The hypotheses in (6) may be decomposed into two one-sided hypotheses, $$H_{01}: \mu_x-\mu_y \leq \theta_L \quad H_{02}: \mu_x-\mu_y \geq \theta_U$$

and $$H_{11}: \mu_x-\mu_y>\theta_L \ H_{12}: \mu_x-\mu_y<\theta_U,$$

where each test is conducted at a nominal level of significance, $\alpha_0$. If $H_{01}$ and $H_{02}$ are both rejected, then in fact we have concluded $\theta_L<\mu_x-\mu_y<\theta_U$. The probability of falsely declaring equivalence for the interval hypotheses, $H_0$ and $H_1$ in (6), is a maximum when $\mu_x-\mu_y=\theta_L$ or $\theta_U$. A paper by Schuirmann, D. J. (1987) A Comparison of the Two One-Sided Tests Procedure and the Power Approach for Assessing the Equivalence of Average Bioavailability, *Journal of Pharmacokinetics and Biopharmaceutics*, 15, 657–680, and herein incorporated by reference, shows that the "true" level of significance, $\alpha$, (i.e., the probability of rejecting $H_0$ when $\mu_x-\mu_y=\theta_L$ or $\theta_U$) never exceeds the nominal level, $\alpha_0$, of the two one-sided tests of $H_{01}$ and $H_{02}$ so we may set the nominal level, $\alpha_0$, equal to $\alpha$. It can be shown that the interval hypothesis testing procedure is operationally identical to the procedure of declaring equivalence only if the classical $1-2\alpha$ confidence interval for $\mu_x-\mu_y$ is completely contained in the equivalence interval. See publication by Westlake, W. J. (1981) Response to T. B. L. Kirkwood: Bioequivalence Testing—A Need to Rethink, *Biometrics*, 37, 589–594.

The limits of the equivalence interval, $[\theta_L,\theta_U]$, are often specified such that $\theta=\theta_U=-\theta_L$. We operate under this assumption throughout the remainder of this description. When the common variance, $\sigma^2$, of the two processes, X and Y, is known, the rejection rule for (6) is to reject $H_0$ in favor of $H_1$ (at a nominal level of significance not exceeding $\alpha$) if a $$-\theta+z_\alpha\sigma_{\bar{X}-\bar{Y}} \leq \bar{X}-\bar{Y} \leq \theta-z_\alpha\sigma_{\bar{X}-\bar{Y}}, \quad (7)$$

where $[-\theta,\theta]$ is the equivalence interval pre-determined before any data is collected. Here, $\sigma_{\bar{X}-\bar{Y}}$ is as defined in (4). Note that in this development we assume possible different sample sizes, $n_x$ and $n_Y$ for the two processes, X and Y, respectively. If $\sigma^2$ is not known, it is then estimated from the data and $z_\alpha$ is replaced by the corresponding percentile of the t-distribution with $n_x+n_y-2$ degrees of freedom in (7).

For this alternative formulation of the hypothesis (6), the sample sizes, $n_x$ and $n_y$ necessary to achieve a power of $1-\beta$ for a nominal level of significance, $\alpha$, must satisfy $$1-\beta=P(-\theta+z_\alpha\sigma_{\bar{X}-\bar{Y}} \leq \bar{X}-\bar{Y} \leq \theta-z_\alpha\sigma_{\bar{X}-\bar{Y}}). \quad (8)$$

In particular, when $\mu_x-\mu_y=\Delta(\Delta<\theta)$ the sample sizes, $n_x$ and $n_y$, are such that $$1-\beta = \Phi\left(\frac{\theta-\Delta}{\sigma_{\bar{X}-\bar{Y}}}-z_\alpha\right) - \Phi\left(\frac{-\theta-\Delta}{\sigma_{\bar{X}-\bar{Y}}}+z_\alpha\right), \quad (9)$$

where $(\Phi)$ denotes the standard normal cumulative distribution function.

In the section that follows, two special cases of equation (9) are considered. One situation involves the equality of the sample sizes from the processes X and Y. If samples are to be gathered from both processes then it would be statistically (and, in most cases, practically) advantageous to obtain the same number of observations from each process (i.e., $n_x=n_y=n$). Often in applications, however, data from one of the processes (usually the standard) is already available. In such cases, the sample sizes, $n_x$, and $n_y$, for the processes X and Y need not be necessarily the same. We will consider both the case when the sample sizes are the same (i.e., samples of size n are to be obtained from both processes) and different (i.e., $n_x$ is fixed and $n_y$ is to be determined).

Case 1: Equal Sample Sizes

The exact sample size will be obtained by setting $n_x=n_y=n$ in equation (4) and solving equation (9) for n numerically since there are no closed form solutions. To obtain an approximation to the required sample size for this case, publication by Bristol, D. R. (1993) Probabilities and Sample Sizes For the Two One-Sided Tests Procedure, *Communications in Statistics—Theory and Methods*, 22, 1953–1961 suggest the formula below $$n = \frac{2\sigma^2(z_\alpha+z_\beta)^2}{(\theta-\Delta)^2}+1. \quad (10)$$

Based upon simulations results by Bristol (1993), under various conditions comparing the approximation in equation (10) to the exact sample size (obtained by numerically solving equation (9)), indicate the simplicity of the approximation generally outweighs the usually complicated evaluations required to obtain the exact sample size by iterative procedures. These simulations were conducted using all combinations of $\alpha=0.05$, $\beta=0.10$ and 0.20, $\theta=0.20$, $\Delta=0.05$ (0.05)0.15, and $\sigma=0.10,(0.10)0.30$, where $\theta$, $\Delta$, and $\sigma$ were specified as multiples of $u_x$.

Case 2: Unequal Sample Sizes

Given that the sample size, $n_x$, for process X is already fixed, the required sample size, $n_y$, to demonstrate equivalence for the hypothesis (6) is obtained by solving (9) numerically since no closed form solutions to $n_y$ is possible. However, the solution of this equation is relatively straightforward to obtain using commercially available spreadsheet software on a standard personal computer. An exemplary technique to solve for one sample size, e.g., $n_y$, when the other sample size is known, e.g., $n_x$ using a Microsoft Excel® spreadsheet is described below in the context of FIG. 4.

Figure 3:
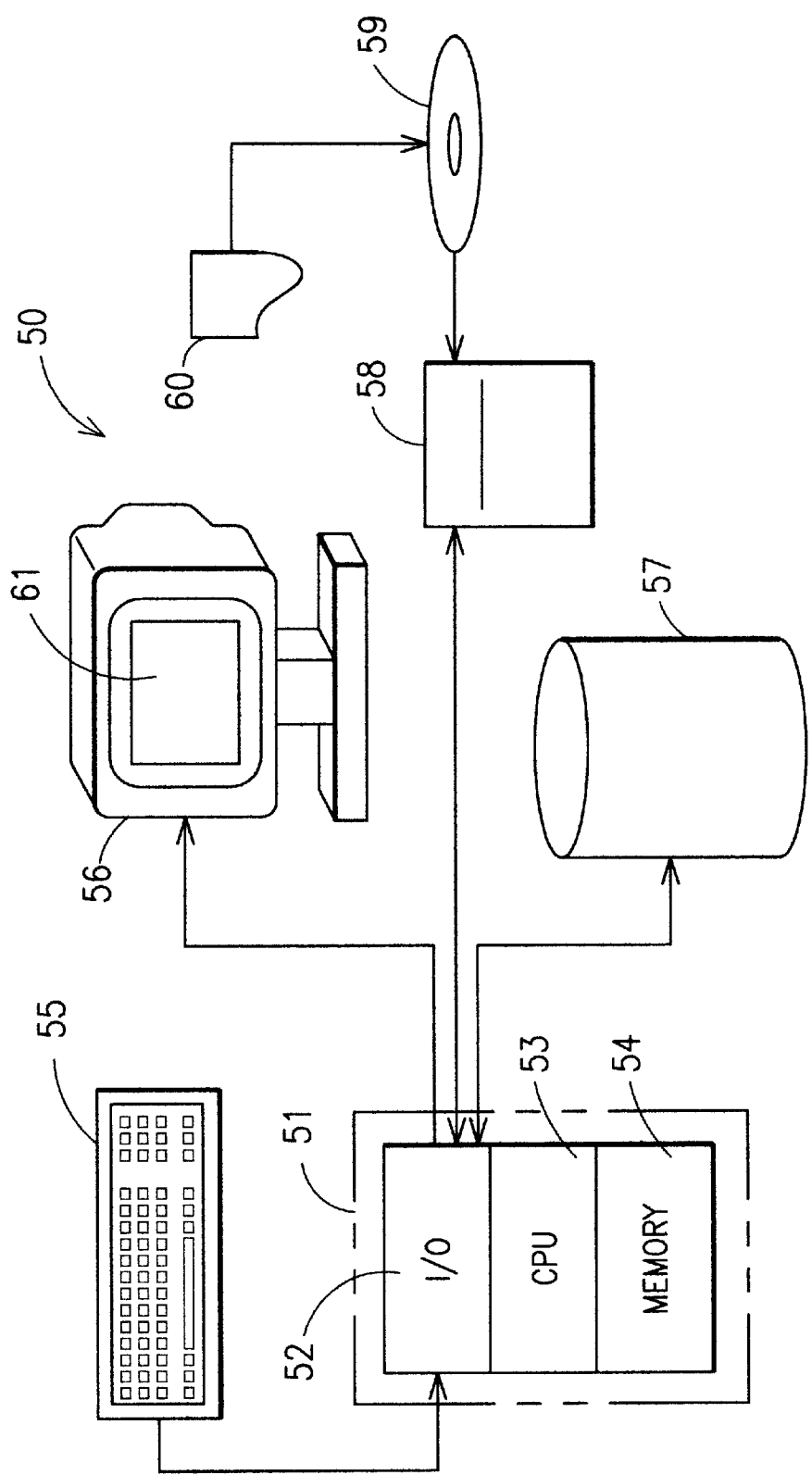
FIG. 3 shows a simplified block diagram of a processor, such as a computer system, that may used for processing the algorithm of FIGS. 1 and 2.

FIG. 1 illustrates an exemplary algorithm of the present invention for implementing the mean value equivalence of two physical processes. Subsequent to start of operations at step 10, step 12 allows for inputting respective upper and lower limits, such as $[\theta_L,\theta_U]$, of a range for testing the mean value equivalence of, for example, processes X and Y As suggested above, the limits of the equivalence interval, $[\theta_L,\theta_U]$, are often specified such that $\theta=\theta_U=-\theta_L$. Step 14 allows for inputting a value for a parameter designated as $\alpha$ and that is indicative of the probability of falsely declaring equivalence in the equivalence range. Step 16 allows for inputting a value for a parameter $1-\beta$ indicative of the probability of correctly declaring equivalence in the equivalence range. Step 18 allows for inputting an externally-derived standard deviation value a being mutually shared by the respective processes X and Y. Step 20 allows for storing each of the inputted values in a standard memory unit 54 (FIG. 3). Prior to return step 24, step 22 allows for computing, based on the stored values, respective sample sizes, $n_x$ and $n_y$, required to determine whether the respective mean values of the processes are equivalent to one another at least within the selected equivalent range and within the respective probabilities.

Figure 2A:
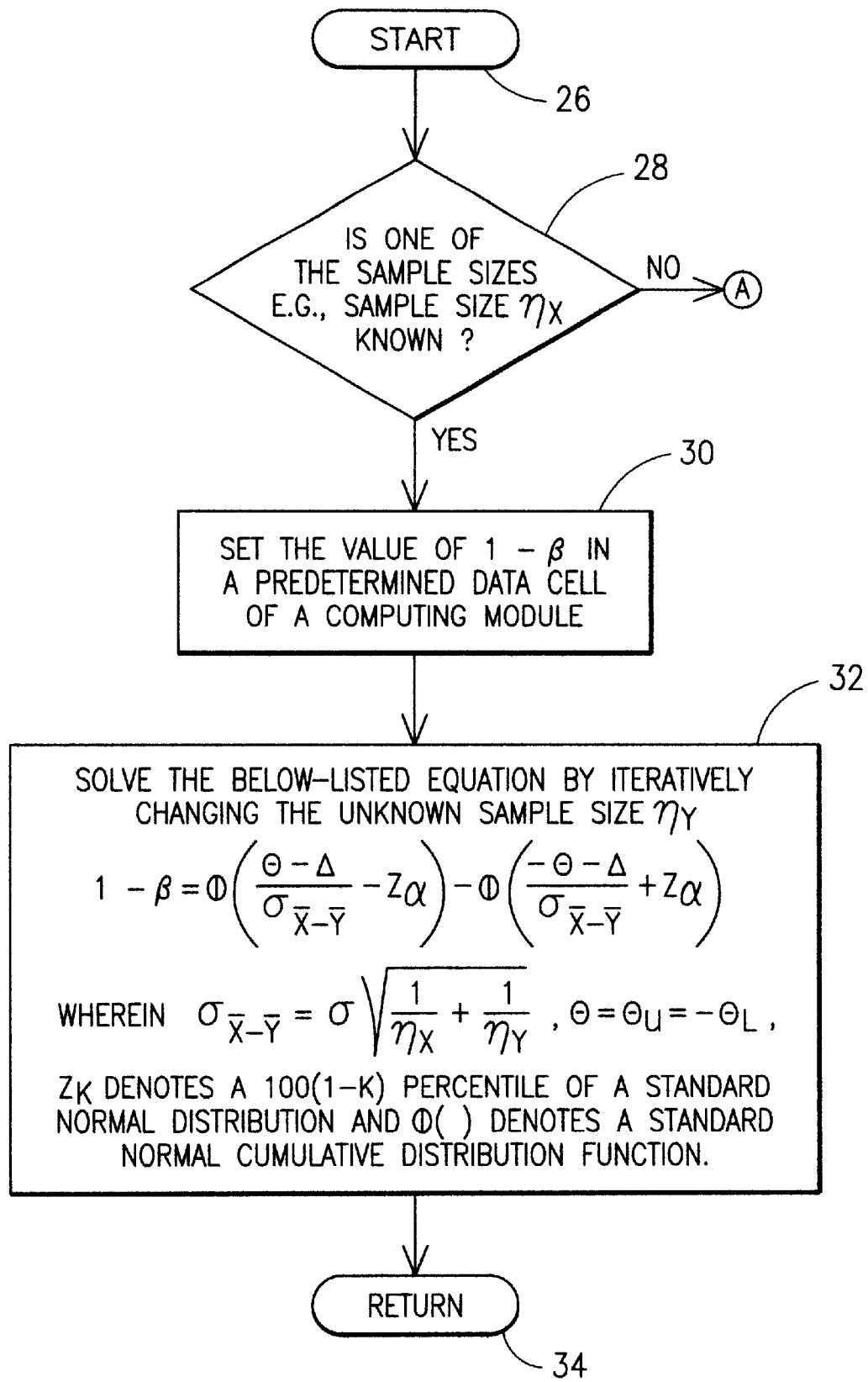
FIGS. 2A and 2B jointly illustrate respective alternative embodiments of the algorithm shown in FIG. 1.

FIG. 2A shows an exemplary algorithm in accordance with one embodiment of the present invention. This embodiment may be particularly useful when one of the sample sizes has been obtained by the user. For example, such sample size may have been obtained if the user is already familiar with a standard manufacturing process that the user may be planning to improve with a new process that may be more economically efficient than the standard process. However, prior to incorporating the new process as part of a large-scale manufacturing operation, in order to avoid potentially costly and embarrassing issues, due to any possible undesirable but still unknown characteristics of the new process, it is desirable to develop a confidence level that in fact the new process, as characterized by its mean or any other suitable statistical parameter, is in fact statistically equivalent to the standard process. That is, the user may want to avoid a pilot experiment to avoid any unpleasant surprises in the event that the new process were to have unacceptable characteristics. As suggested above, even for the pilot project, it is desirable to minimize the cost and time resources allocated to that project. Thus, it is desirable for the user to be able to determine a sample size that is relatively small yet sufficiently robust to provide a valid determination of whether the standard process and the new process are statistically equivalent to one another. In this embodiment, subsequent to start of operations in step 26, step 28 allows for determining whether one of the sample sizes, e.g., sample size $n_x$, is known. If one of the sample sizes is known, then step 30 allows for setting the value of power $1-\beta$ in a predetermined data field of a suitable programmable computing module 56 (FIG. 2). If none of the sample sizes is known, then the algorithm continues at step 36 by way of connecting node A. Step 32 allows for solving equation 9 listed above by iteratively changing the unknown sample size $n_y$ until a sufficiently accurate numerical solution is obtained by the computing module.

Figure 2B:
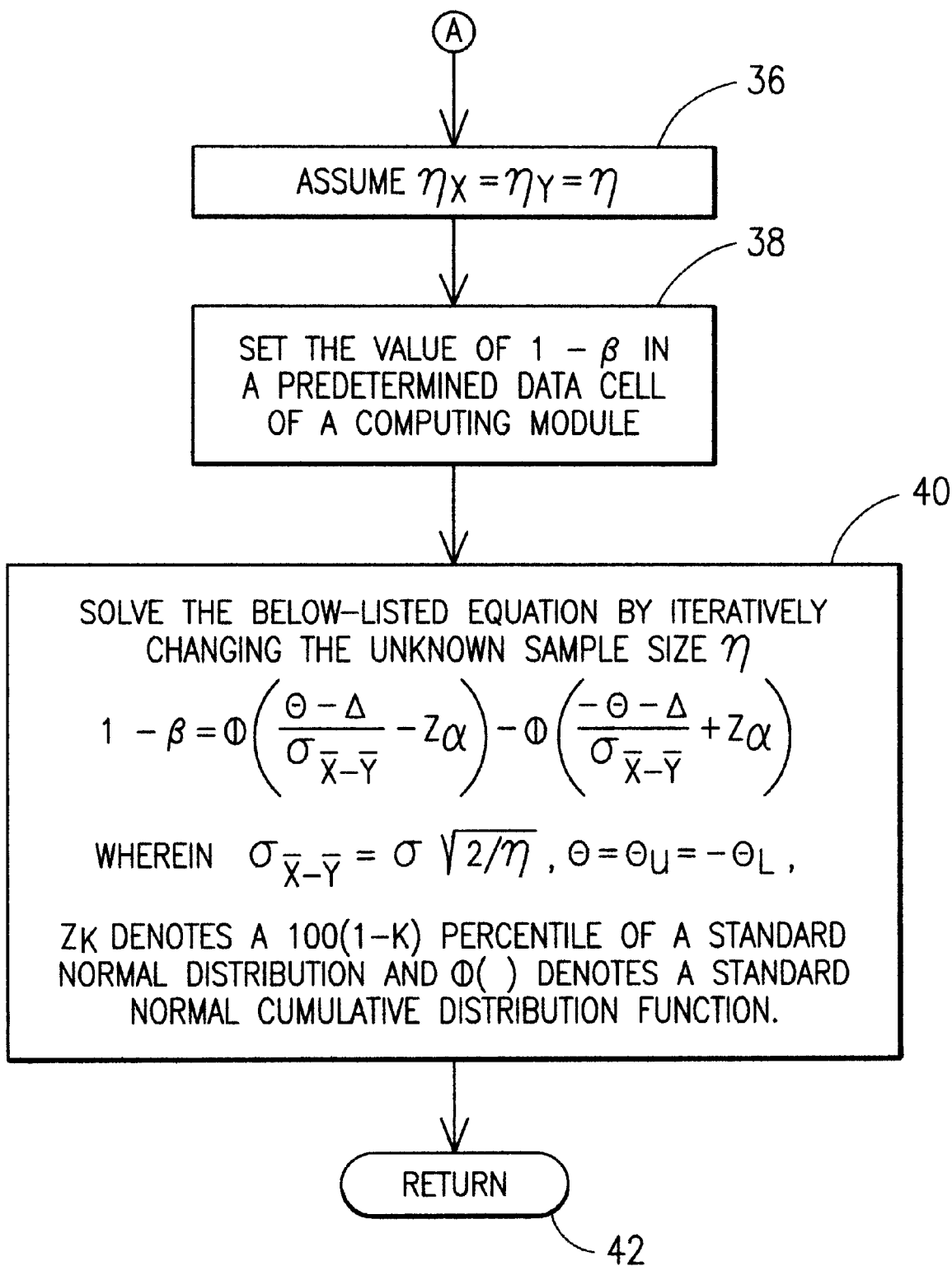

FIG. 2B illustrates an algorithm suitable for a situation where neither sample size $n_x$ or sample size $n_y$ are known to the user. In this case, step 36 allows for assuming that the two sample sizes are equal to one another, that is, $n_x=n_y=n$. Step 38 allows for setting the value of power $1-\beta$ in a predetermined data field of computing module 56. Prior to return step 42, step 40 allows for solving equation 9 above by iteratively changing the unknown sample size n and by taking into account that in this case $$\sigma_{\bar{X}-\bar{Y}}=\sigma\sqrt{2/n}.$$

Figure 4:
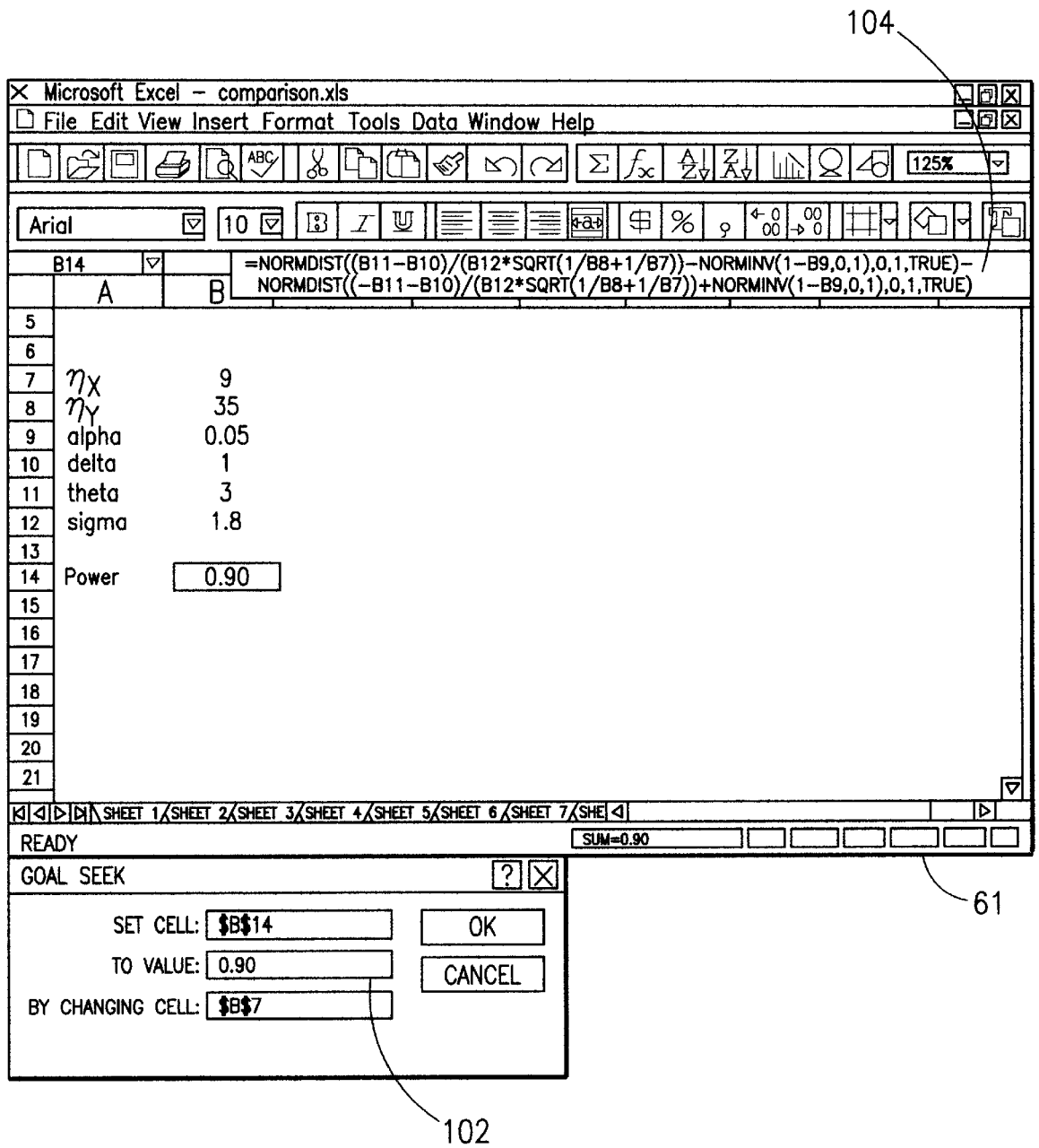
FIG. 4 shows an exemplary screen display of a software processor configured for executing the algorithm embodiment of FIGS. 1 and 2.

FIG. 3 shows an exemplary processing system, such as a computer system 50, that can be conveniently used for processing the algorithms of the present invention. Some of the components of computer system 50 are illustrated in FIG. 3, wherein a processor 51 has an input-output (I/O) unit 52, a central processing unit (CPU) 53 and a memory section 54. The I/O unit may be electrically coupled to a keyboard 55, which in combination may readily provide one simple implementation of means for inputting the respective parameter values described in the context of FIGS. 1 and 2. The I/O unit 52 may be further connected to a display unit 56, a disk storage unit 57 and a CD-ROM drive unit 58. The CD-ROM unit can read a suitable CD-ROM medium 59 that may contain a suitable software application 60 and/or data. An exemplary screen display 61, better seen in FIG. 4, is shown on display unit 56.

Interpretation of Parameters

This section provides additional details in connection with the various parameters used in the algorithm in accordance with the present invention. As suggested above, respective values of the parameters $\theta$, $\Delta$, $\alpha$, $\beta$, and $\sigma$ are required to determine the sample size for the interval hypothesis testing approach. The $\theta$ parameter defines the equivalence limits (assuming, $\theta=\theta_U=-\theta_L$) that determine how sufficiently close we require the process means to be to declare them practically equivalent; it should be well defined prior to the collection of any data. The planning value, $\Delta\mu_x-\mu_y$, specifies a location shift of the X and Y distributions. We note from equation (9) that the power function (as a function of $\Delta$) is symmetric about 0. As $\Delta$ ranges between $-\theta$ and $\theta$, the probability of concluding an equivalence of the process means is highest at $\Delta=0$ and decreases as $\Delta$ approaches $-\theta$ or $\theta$. As $\Delta$ approaches the limits of the equivalence interval, larger sample sizes and a higher degree of precision (i.e., smaller $\sigma$) are needed to declare equivalence. When $\Delta=\theta$, the true difference between the process means lies on the border of the equivalence limits. As suggested above, if a $1-2\alpha$ confidence interval for the difference between process means is completely contained in the equivalence interval, then the respective process means are declared to be equivalent. Therefore, by way of example and not of limitation, the algorithm of the present invention is assumed to preferably consider cases where both parameters ($\theta$ and $\Delta$) are positive and such that $\theta>\Delta$.

In the revised formulation, the type I error, $\alpha$, denotes the probability of falsely declaring equivalence of two process means; it is often set to $\alpha=0.05$. The power of the hypothesis test (6) (i.e., $1-\beta$) is the probability of (correctly) declaring equivalence. Note the type I ($\alpha$) and type II ($\beta$) errors have a different interpretation in the revised formulation than in the classical formulation. In the classical formulation, the type I error is the probability of falsely declaring a difference between two process means and the power, $1-\beta$, is the probability of (correctly) declaring a difference between the process means.

The value of $\sigma$ is the common (and assumed known) standard deviation of both processes, X and Y. It is often specified based upon pilot studies or engineering and scientific knowledge. A case study the section that follows will further help clarify the meaning of the various parameters used in the algorithm of the present invention. It will be appreciated by those skilled in the art that there does not appear to be any valid or meaningful comparison to be made between the classical and revised formulation of the present invention since the classical approach is simply an improper formulation of the problem. For example, a statement of "no difference" does not have the same meaning as a statement of "equivalence". Notably, however, those who continue to adopt the methods of the classical approach when it is of interest to demonstrate equivalence will unfortunately obtain too large a value of n, generally yielding a waste of valuable resources without obtaining improvements in the accuracy of the statistical determination.

First Exemplary Case Study

In the following exemplary case study, we consider the process of developing goods, such as engineered thermoplastics by an extrusion process where the product is made in lot form. The property of interest in the case study is the deflection temperature (DT) under flexural load, however, it will be appreciated by those skilled in the art, that the property of interest could be any property of interest to the user. As described in the ASTM Standard 648, the testing of this property aims to determine the temperature at which a specified deformation of a molded test bar occurs under load. Based upon some previous test runs, the nominal value of DT for this application is approximately 170° C. A random sample of materials from each lot will be tested via the DT test. We assume negligible variability of the measured property within lot where the major source of variability is between lots (i.e., lot to lot).

In the exemplary case study, it is of interest to compare a new stabilizer, Y, used to manufacture thermoplastics, with the standard one, X. Recent data suggests the mean and standard deviation of the standard process are 172.5° C. and 1.8° C., respectively. Histograms confirm this data are reasonably normally distributed. To determine if the two stabilizers, X and Y, are equivalent, some data will be gathered only from the new process Y as DT data on $n_x=35$ lots of the standard stabilizer process (X) is already available.

The product developer desires to show that the means of the two stabilizers are practically equivalent (i.e., $-\theta<\mu_x-\mu_y<\theta$) where $\theta=3°$ C. The probability of falsely declaring equivalence when the difference between the two process means is actually greater than 3° C. is set to $\alpha=0.05$, ($z_{0.05}=1.645$). A 1° C. location shift in either direction of the old stabilizer from the new stabilizer is chosen as the planning value for $\Delta$ (i.e., $\Delta\mu_x-\mu_y=1$). The desired power to demonstrate an equivalence is $1-\beta=0.90$, ($z_{0.10}=1.28$). Therefore, the probability of falsely concluding the process means are not close enough to be considered equivalent when $\mu_x-\mu_y=1°$ C. is 10%. The sample sizes and precision of the estimated difference between the process means will determine whether or not a declaration of equivalence is warranted. It is assumed both processes will have similar lot to lot standard deviations whose value (based upon previous test runs for stabilizer, X) is estimated to be about 1.8° C. Using the procedure discussed below in the context of FIG. 4 to solve for $n_y$ in (9), the required number of lots for the new stabilizer process is $n_y=9$.

Had no historical data been available for either type of stabilizer process and setting $\alpha=0.05$, $\beta=0.10$, $\sigma=1.8$, $\Delta=1$, and $\theta=3$ as above, the number of lots to be sampled from each process (see (10)) is approximately $$n = \frac{2(1.8^2)(1.645+1.28)^2}{(3-1)^2} + 1 \approx 15.$$

The exact solution (obtained using a Microsoft Excel® spreadsheet) for the equal sample size case yields a sample size of n=14.

Second Exemplary Case Study

In this second case study relevant to a process for manufacturing lamps or lighting tubes, such as fluorescent lamps. One sample preparation technique used to determine mercury content (Hg) in solution is a cold vapor (CV) digestion method. This digestion includes the addition of sulfuric acid and nitric acid to a sample aliquot that will result in a final concentration between one and forty parts per billion (ppb) in the final solution. There are several advantages to another method which eliminates the cold vapor digestion step by diluting the samples in nitric acid/potassium dichromate solution to stabilize ppb levels of mercury. This second method will be referred to as the acid dilution (AD) method. A study was conducted to compare the two methods (CV vs. AD) of measuring mean mercury (Hg) content in sections of fluorescent light bulbs to determine if they are equivalent.

Available data suggests the mean and standard deviation mercury content using the (standard) CV method is 0.045 mg and 0.002 mg, respectively. Histograms confirm the data are reasonably normally distributed. To determine if the two methods are equivalent, some data will be gathered from the AD method since $n_x=15$ data values from the CV method are already available.

The engineers desire to show that the means are practically equivalent if the ratio of the bound mercury means ($\mu_{AD}/\mu_{CV}$) lies within the interval [0.80, 1.201 ] (i.e., $\theta=0.20\mu_{CV}$). The probability of falsely declaring equivalence when the ratio of the two process means is greater than $\theta=0.20\mu_{CV}$ is set to $\alpha=0.05$ ($z_{0.05}=1.645$). A 10% location shift (on the ratio scale) in either direction of the old stabilizer from the new stabilizer is chosen as the planning value for $\square$ (i.e., $\square=0.10\mu_{CV}$). The desired power to demonstrate an equivalence is $1-\beta=0.90$ ($z_{0.10}=1.28$). The sample sizes and precision of the estimated difference between the process means will determine whether or not a declaration of equivalence is warranted. We assume the process standard deviation is about 4% of the reference mean (i.e., $\sigma=0.044\mu_{CV}$). Using the procedure outlined below to solve for $n_y$ in equation (9), the required number of lots for the new stabilizer process is $n_y=2$. From the above examples, it will be appreciated that the present invention has a wide range of applicability to diverse manufacturing processes and it will be understood that such examples are merely illustrative of the vast applicability of the present invention.

Although sample sizes should be viewed as recommended guidelines for planning an experiment, it may not be feasible to meet the sample size requirements in certain practical situations. For example, suppose the recommended sample size is 15 units from process X and 20 units from process Y but due to monetary constraints, only 8 units from process X and 12 units from process Y are available. How does the use of sample sizes which are smaller than the ones recommended affect the outcome of the experiment? The use of sample sizes which are smaller than those recommended will impact the type I ($\alpha$) and type II ($\beta$) errors and will result in a lower probability of correctly detecting "equivalence" at a nominal level of significance, $\alpha$. However, even in those cases, the techniques of the present invention would allow the user to configure the Microsoft Excel® spreadsheet to determine the amount by which the type I and type II errors will be affected in such cases.

FIG. 4 shows an exemplary screen display 100 that illustrates use of a commercially available software tool that may conveniently be used to implement the algorithm of the present invention. By way of example and not of limitation, the "Goal Seek" computing module found under the "Tools" module in the Microsoft Excel® spreadsheet was used to solve equation (9) for sample size $n_y$ based in our exemplary case study. Respective values of parameters $n_x$, $\alpha$, $\sigma$, $\Delta$, and $\theta$ are specified and we set the power $(1-\beta)$ in the "To value" data field to 0.90. The "By changing" data field is conveniently assigned to the sample size to be determined, which in this example corresponds to sample size $n_y$. As will be appreciated by those skilled in the art, straight forward modifications of the formula in the formula bar 104 will conveniently allow the user to obtain the sample size, n, for the equal sample size case.

While the preferred embodiments of the present invention have been shown and described herein, it will be obvious that such embodiments are provided by way of example only. For example, the interval hypothesis testing of the present invention may be readily extended to experimental designs other than the two-sample case. For these extensions, the square root of the mean square error (MSE) of the experimental design substitutes for $\sigma$ in the formulas above. Least square means substitute for sample means in such cases. Thus, numerous variations, changes and substitutions will occur to those of skill in the art without departing from the invention herein. Accordingly, it is intended that the invention be limited only by the spirit and scope of the appended claims.

What is claimed is:

1. A computer-based method for determining the sample size necessary to demonstrate an equivalence of the respective mean values of two physical processes, X and Y, used in the production of predetermined goods, the method comprising:

inputting respective values for upper and lower limits [$\theta_L, \theta_U$] of a range for testing the mean value equivalence of the respective processes;

inputting a value for a parameter $\alpha$ indicative of a probability of falsely declaring equivalence in the equivalence range;

inputting a value for a parameter $1-\beta$ indicative of a probability of correctly declaring equivalence in the equivalence range;

inputting a value indicative of an externally-derived standard deviation $\sigma$ being mutually shared by the respective processes;

inputting a value for a parameter $\Delta$ indicative of a planned shift between the respective mean values of the respective processes;

storing each inputted value from the foregoing inputting steps into a memory unit; and computing, based on the stored values, respective sample sizes, $n_x$, and $n_y$, required by the respective processes X and Y to determine whether the respective mean values of said respective processes are equivalent to one another at least within the selected equivalence range and within the respective probabilities, the magnitude of the respective sample sizes being sufficiently small to allow a user to experimentally demonstrate the equivalence of the respective mean values of the respective processes, wherein the computing step uses a computing module configured to compute the sample size of that other process by setting the value of parameter $1-\beta$ in a predetermined data field of the computing module based on the following equation:

$$1 - \beta = \Phi\left(\frac{\theta - \Delta}{\sigma_{X-Y}} - z_a\right) - \Phi\left(\frac{-\theta - \Delta}{\sigma_{X-Y}} + z_a\right),$$

wherein $$\sigma_{X-Y} = \sigma\sqrt{\frac{1}{n_X} + \frac{1}{n_Y}},$$

$\theta = \theta_U = -\theta_L$, $z_k$ denotes a 100(1-K) percentile of a standard normal distribution and ($\Phi$) denotes a standard normal cumulative distribution function.

2. The computer-based method of claim 1 wherein the sample size of one of the processes is externally-derived and the sample size of the other process is to be determined in the computing step.

3. The computer-based method of claim 1 wherein the predetermined goods comprise thermoplastics.

4. The computer-based method of claim 1 wherein the predetermined goods comprise lamps.

5. A computer-based method for determining the sample size necessary to demonstrate an equivalence of the respective mean values of two physical processes, X and Y, used in the production of predetermined goods, the method comprising:

inputting respective values for upper and lower limits [$\theta_L, \theta_U$] of a range for testing the mean value equivalence of the respective processes;

inputting a value for a parameter $\alpha$ indicative of a probability of falsely declaring equivalence in the equivalence range:

inputting a value for a parameter $1-\beta$ indicative of a probability of correctly declaring equivalence in the equivalence range;

inputting a value indicative of an externally-derived standard deviation $\sigma$ being mutually shared by the respective processes;

inputting a value for a parameter $\Delta$ indicative of a planned shift between the respective mean values of the respective processes;

storing each inputted value from the foregoing inputting steps into a memory unit; and computing, based on the stored values, respective sample sizes, $n_x$, and $n_y$, required by the respective processes X and Y to determine whether the respective mean values of said respective processes are equivalent to one another at least within the selected equivalence range and within the respective probabilities, the magnitude of the respective sample sizes being sufficiently small to allow a user to experimentally demonstrate the equivalence of the respective mean values of the respective processes, wherein the computing step uses a computing module configured to compute sample size $n_x$ by setting the value of parameter $1-\beta$ in a predetermined data field of the computing module based on the following equation:

$$1 - \beta = \Phi\left(\frac{\theta - \Delta}{\sigma_{X-Y}} - z_a\right) - \Phi\left(\frac{-\theta - \Delta}{\sigma_{X-Y}} + z_a\right),$$

wherein $\sigma_{\overline{X}-\overline{Y}} \sigma\sqrt{2/n}$, $\theta = \theta_U = -\theta_L$, $z_k$ denotes a 100(1-K) percentile of a standard normal distribution and ($\Phi$) denotes a standard normal cumulative distribution function.

6. The computer-based method of claim 5 wherein each sample size of the respective processes X and Y processes is presumed to be equal to one another, $n_x = n_y = n$ and said sample size is to be determined in the computing step.

7. The computer-based method of claim 5 wherein the predetermined goods comprise thermoplastics.

8. The computer-based method of claim 5 wherein the predetermined goods comprise lamps.

9. A processor for determining the sample size necessary to demonstrate an equivalence of the respective mean values of two physical processes, X and Y, used in the production of predetermined goods, the processor comprising:

means for inputting respective upper and lower limits [$\theta_L, \theta_U$] of a range for testing the mean value equivalence of the respective processes;

means for inputting a value $\alpha$ indicative of a probability of falsely declaring equivalence in the equivalence range;

means for inputting a value $1-\beta$ indicative of a probability of correctly declaring equivalence in the equivalence range;

means for inputting an externally-derived standard deviation value $\sigma$ being mutually shared by the respective processes;

means for inputting a value $\Delta$ indicative of a planned shift between the respective mean values of two processes, X and Y;

a memory unit for storing each inputted value;

a computing module coupled to the memory unit to receive each stored value, the computing module configured to determine respective sample sizes, $n_x$, and $n_y$, required by the respective processes X and Y to deter mine whether the respective mean values of said respective processes are equivalent to one another at least within the selected equivalence range and within the respective probabilities, the magnitude of the respective sample sizes being sufficiently small to allow a user to experimentally demonstrate the equivalence of the respective mean values of the respective processes, wherein the computing module is configured to compute the sample size of that other process by the user setting the value $1-\beta$ in a predetermined data field of the computing module based on the following equation:

$$1-\beta = \Phi\left(\frac{\theta-\Delta}{\sigma_{\overline{X}-\overline{Y}}} - z_\alpha\right) - \Phi\left(\frac{-\theta-\Delta}{\sigma_{\overline{X}-\overline{Y}}} + z_\alpha\right),$$

wherein $$\sigma_{\overline{X}-\overline{Y}} = \sigma\sqrt{\frac{1}{n_X} + \frac{1}{n_Y}},$$

$\theta=\theta_U=-\theta_L$, $z_k$ denotes a $100(1-K)$ percentile of a standard normal distribution and $(\Phi)$ denotes a standard normal cumulative distribution function.

10. The processor of claim 9 wherein the sample size of one of the processes is known and the sample size of the other process is to be determined by the computing module.

11. The processor of claim 9 wherein the predetermined goods comprise thermoplastics.

12. The processor of claim 9 wherein the predetermined goods comprise lamps.

13. A processor for determining the sample size necessary to demonstrate an equivalence of the respective mean values of two physical processes, X and Y, used in the production of predetermined goods, the processor comprising:

means for inputting respective upper and lower limits $[\theta_L, \theta_U]$ of a range for testing the mean value equivalence of the respective processes;

means for inputting a value $\alpha$ indicative of a probability of falsely declaring equivalence in the equivalence range;

means for inputting a value $1-\beta$ indicative of a probability of correctly declaring equivalence in the equivalence range;

means for inputting an externally-derived standard deviation value $\sigma$ being mutually shared by the respective processes;

means for inputting a value $\Delta$ indicative of a planned shift between the respective mean values of two processes, X and Y;

a memory unit for storing each inputted value, a computing module coupled to the memory unit to receive each stored value, the computing module configured to determine respective sample sizes, $n_x$, and $n_y$, required by the respective processes X and Y to determine whether the respective mean values of said respective processes are equivalent to one another at least within the selected equivalence range and within the respective probabilities, the magnitude of the respective sample sizes being sufficiently small to allow a user to experimentally demonstrate the equivalence of the respective mean values of the respective processes, wherein the computing module is configured to compute sample size $n_x$ by setting the value $1-\beta$ in a predetermined data field of the computing module based on the following equation:

$$1-\beta = \Phi\left(\frac{\theta-\Delta}{\sigma_{\overline{X}-\overline{Y}}} - z_\alpha\right) - \Phi\left(\frac{-\theta-\Delta}{\sigma_{\overline{X}-\overline{Y}}} + z_\alpha\right),$$

wherein $\sigma_{\overline{X}-\overline{Y}} = \sigma\sqrt{2/n}$, $\theta=\theta_U=-\theta_L$, $z_k$ denotes a $100(1-K)$ percentile of a standard normal distribution and $(\Phi)$ denotes a standard normal cumulative distribution function.

14. The processor of claim 13 wherein each sample size of the respective processes X and Y processes is presumed to be equal to one another, $n_x=n_y=n$ and said sample size is to be determined by the computing module.

15. The processor of claim 13 wherein the predetermined goods comprise thermoplastics.

16. The processor of claim 13 wherein the predetermined goods comprise lamps.

* * * * *